United States Patent [19]

Boss

[11] Patent Number: 4,810,888

[45] Date of Patent: Mar. 7, 1989

[54] ELECTROSTATIC SHIELD FOR CRYOSTAT DEWAR

[75] Inventor: Harold O. Boss, Corona Del Mar, Calif.

[73] Assignee: Ford Aerospace & Communications Corporation, Detroit, Mich.

[21] Appl. No.: 49,481

[22] Filed: May 14, 1987

[51] Int. Cl.⁴ .................................................. G01J 5/16
[52] U.S. Cl. ................................... 250/352; 62/514 R
[58] Field of Search .......... 250/352; 62/514 R, 514 JT

[56] References Cited

U.S. PATENT DOCUMENTS

| | | |
|---|---|---|
| 3,942,010 | 3/1976 | Peterson et al. ............... 250/352 |
| 4,178,775 | 12/1979 | Smetana ....................... 62/514 JT |
| 4,206,354 | 6/1980 | Small, Jr. ...................... 250/352 |

FOREIGN PATENT DOCUMENTS 2082697 12/1971 France .

Primary Examiner—Janice A. Howell
Assistant Examiner—John A. Miller
Attorney, Agent, or Firm—Edward J. Radlo; Keith L. Zerschling

[57] ABSTRACT

Coolant gas pumped into the inner flask (3) of a cryostat dewar (2) causes an unwanted electrostatic charge on the inner surface (34) of the inner flask (3). This electrostatic charge can put an unwanted noise into the electrical output from an electromagnetic detector (16) cooled by the cryostat (2). The invention comprises a foraminous metallic screen (7) interposed between coolant coils (5) of the cryostat (2) and said inner surface (34). The screen (7) siphons off unwanted electrostatic charge from said surface (34) while allowing coolant to contact said surface (34) and thus allow cooling of the detector (16).

6 Claims, 2 Drawing Sheets

ELECTROSTATIC SHIELD FOR CRYOSTAT DEWAR

DESCRIPTION

This invention is a subject invention under U.S. government contract DAAH01-82-C-A298 and, as such, the U.S. government has rights therein.

1. Technical Field

This invention pertains to the field of reducing unwanted electrostatic-charge-induced noise in the electrical response of a detector cooled by a cryostat dewar.

2. Background Art

U.S. Pat. No. 3,942,010 discloses a cryostat-cooled infrared cell in which a thin coating 18 of lead sulfide is applied to the radially innermost surface of the inner flask of a cryostat dewar in order to suppress unwanted electrostatic noise; col. 1 lines 60–68, col. 3 lines 31–38.

FIG. 2 of the reference patent shows that the detector end of the inner flask is not protected with the lead sulfide coating 18, perhaps out of fear that the use of lead sulfide here would impede heat transfer at this critical area. The preferred embodiment of the present invention does not suffer from this gap in protection, because the holes in metallic screen 7 allow heat transfer while providing electrostatic protection.

The coating 18 of the reference patent suffers from two additional infirmities which are remedied by the present invention: coolant gas residing within the inner flask erodes coating 18 over time; and it is difficult to apply coating 18 to the inner surface of the inner flask when the dimensions are very small, as they must be for certain applications.

U.S. Pat. No. 4,178,775 discloses a cryostat assembly wherein, to mitigate the problem of unwanted electrostatic charge, the inventor positions his nozzle 32 so that coolant gas exits the nozzle tangential to the inner surface of his inner flask 21.

French Pat. No. 2.082.697 discloses a cryostat dewar having a cold metallic sheet 7 used for temperature control (page 1, lines 13-14), not for electrostatic charge control as in the present invention. Sheet 7 of the reference lies between the two glass envelopes of the cryostat dewar, not within the inner envelope as in the present invention.

DISCLOSURE OF INVENTION

The present invention is a cryostat dewar (2) having inner and outer flasks (3, 4, respectively). A detector (16) responsive to electromagnetic radiation is positioned in an evacuated space (29) between the two flasks (3, 4). A coolant is pumped into a region (25) within the inner flask (3) via cryostat coils (5). A gaseous phase of the coolant striking the inner surface (34) of the inner flask (3) creates an unwanted electrostatic charge on said surface (34), which can cause unwanted electrical noise in the lead wires (20) emanating from the detector (16). A foraminous metallic screen (7) is interposed between the cryostat coils (5) and the inner flask (3) in order to siphon off the unwanted electrostatic charge while allowing coolant to contact said inner surface (34) and thereby cool the detector (16).

BRIEF DESCRIPTION OF THE DRAWINGS

These and other more detailed and specific objects and features of the present invention are more fully disclosed in the following specification, reference being had to the accompanying drawings, in which:

FIG. 3 is a plan view of the layout for the precursor of foraminous electrostatic shield 7 of the present invention.

BEST MODE FOR CARRYING OUT THE INVENTION

Figure 1:
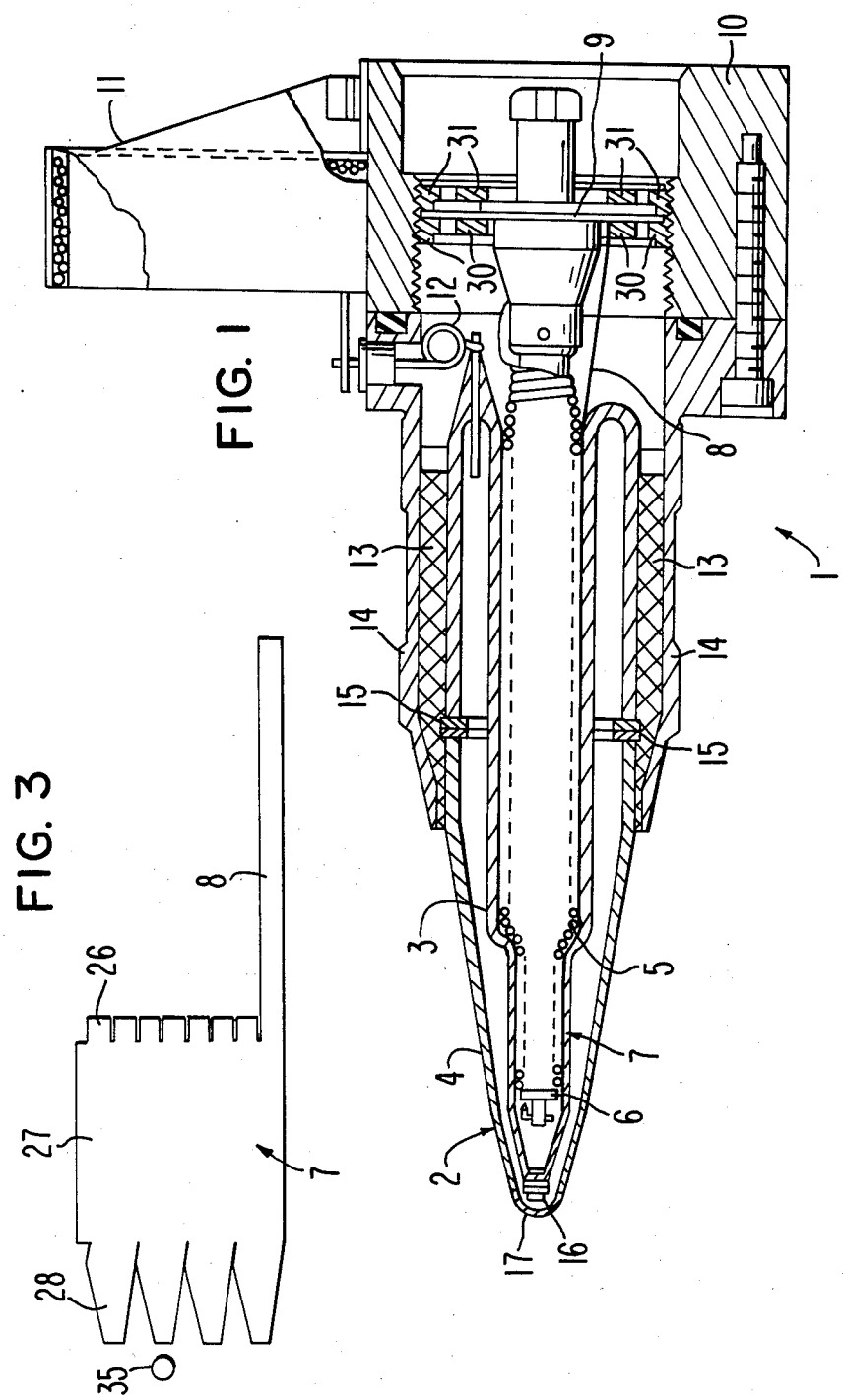
FIG. 1 is a partly elevated, partly cross-sectional side view of a refrigerated detector unit 1 incorporating the present invention.

FIG. 1 shows a typical refrigerated detector unit (RDU) 1 incorporating the present invention. A detector 16, responsive to electromagnetic radiation, is positioned behind a transparent dome 17 in a thermally insulating vacuum 29 formed by an inner glass flask 3 and an outer glass flask 4. The two flasks are part of a cryostat dewar 2, which is shown as having, for packaging reasons, a tapered front (detector) end.

Within inner flask 3 is a continuous helically shaped cryostat coil 5 for conveying a coolant, which may be present in a liquid or a gaseous phase, from a region external to and to the right of RDU 1. The purpose of the coolant is to cool detector 16 so that it may operate more efficiently. The coolant has an increasing temperature from left to right in the Figures. As one proceeds from left to right, the coolant converts from a liquid into a gas.

Figure 2:
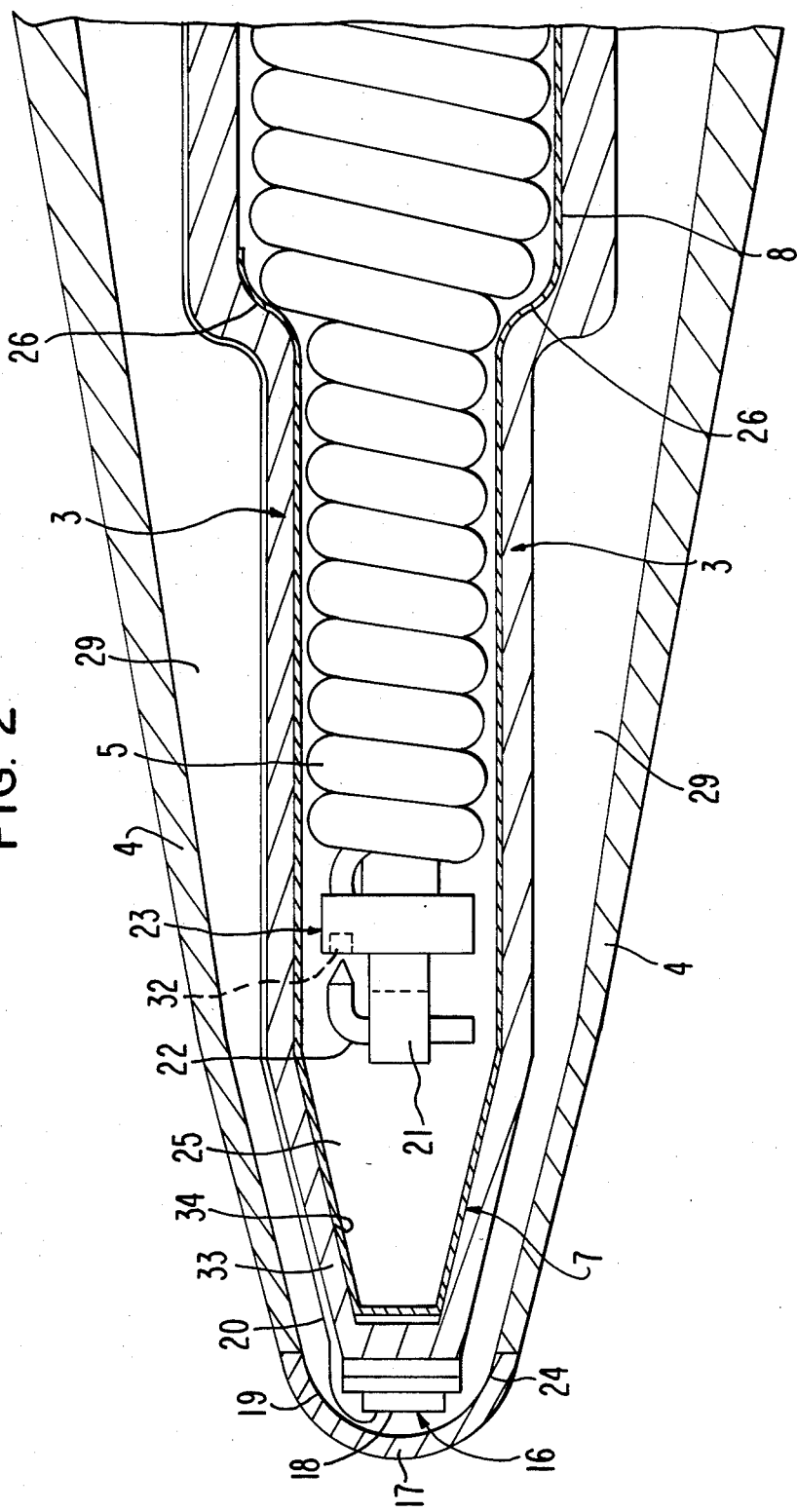
FIG. 2 is a magnified version of the front (detector 16) portion of the apparatus illustrated in FIG. 1.

At the detector end of the cryostat coils 5 is a thermostatically operated automatic throttle 6, shown in more detail in FIG. 2, for regulating the flow of coolant to a region 25 within the nose 33 of inner flask 3.

Electrostatic shield 7 of the present invention is positioned between the cryostat coils 5 and the inner surface 34 of the inner flask 3. Shield 7 is coupled via a narrow, metallic, integrally formed grounding strap 8 to an electrical ground 10. Shield 7 advantageously siphons off unwanted electrostatic charge from said inner surface 34, while allowing the coolant to cool detector 16. The electrostatic charge develops when the coolant, which is in a gaseous phase as it exits the cryostat coils 5, comes into contact with said inner surface 34. When RDU 1 experiences motion, this unwanted electrostatic charge causes an unwanted white noise in the electrical output from detector 16. This output flows through lead wires 20 and curlicue wire 12 to preamplifier 11.

In the embodiment illustrated in the Figures, grounding strap 8 is welded to washer 9, which is sandwiched between two metallic nuts 30, 31 that are connected to a metallic mass 10 supporting the cryostat assembly 2.

Emanating from metallic mass 10 is a cylindrically-sleeve shaped flange 14 which grips cryostat dewar 2 via a cylindrically-sleeve shaped silicon rubber vibration-resistant pad 13. For fabrication purposes, outer flask 4 is formed in two parts, which are soldered together at joint 15.

FIG. 2 shows that, in this typical embodiment, detector 16 comprises two stages 18, 19 mounted onto the tip of inner flask 3 via heat conducting platform 24. In the region 25 within nose 33 of the inner flask, the coolant is in a liquid phase. Thermostatically controlled automatic throttle 6 comprises a moving rod 21 holding a throttle pintle 22, which selectively (based on temperature) fits into an orifice 32 in throttle body 23, alternately impeding or allowing flow of coolant gas from cryostat coils 5 out of orifice 32.

Electrostatic shield 7 is a foraminous metallic screen. It is desirable to have the mesh be as fine as possible for reasons of electrostatic charge reduction, but not so fine that screen 7 will not allow the passage of coolant therethrough. It is in the region of nose 33 where the cooling requirements are most critical. Here the coolant is a liquid.

In the nose region 33, the need for electrostatic protection also becomes more critical. Therefore, it is usually desired to have electrostatic shield 7 cover the entire inside surface of nose 33. Thus, in the illustrated embodiments, shield 7 has the shape of a cylindrical sleeve closed at the detector 16 end. The mesh is a plain-woven wire cloth having medium openings, and a wire diameter of 0.001 inch. A suitable mesh size is 400 wires to the inch. All the cross wires are welded or sintered to prevent unraveling. A suitable material is 300 series stainless steel. It is necessary that the material for shield 7 be impervious to corrosion from the coolant (which is typically nitrogen, air, or argon) and that it remain ductile at low temperatures, such as 75° Kelvin.

FIG. 2 shows an embodiment in which the nondetector end of the cylindrical shield 7 flares outwardly into a flange 26, which is mechanically useful because, in this embodiment, the cryostat coils 5 change diameter at a certain point: the wider diameter coils 5 hold flange 26 against the inner surface 34 of inner flask 3. Rightward of flange 26, it is not necessary to have an electrostatic shield, because of the relatively great distance from detector 16. Therefore, simply a thin electrically conductive strap 8, rather than a cylindrical sleeve, is sufficient to siphon away the accumulated electrostatic charge.

FIG. 3 shows a form which can be used for cutting a flat piece of stainless steel mesh which, when rolled and welded, becomes electrostatic shield 7. The right portions of shield 7 are flared outwardly to form flange 26. The middle portion becomes cylindrical portion 27, and the left portion becomes nose portion 28. At the extreme lower right is grounding strap 8. After the form is rolled into a cylindrical shape and welded along the edges, circular end cap 35 is welded to the form (just around the edges of cap 35, to keep the detector end of screen 7 porous) using a resistance spot welding machine, thereby completing the fabrication of screen 7.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A cryostat dewar comprising:
   inner and outer flasks;
   a detector producing an electrical response to electromagnetic radiation, said detector being positioned in an evacuated space between the two flasks;
   means for pumping a coolant into the inner flask via cryostat coils, said coolant creating an unwanted electrostatic charge on an inner surface of the inner flask, said electrostatic charge placing unwanted electrical noise into the electrical response of the detector; and
   a foraminous metallic mesh interposed between the cryostat coils and the inner surface, said mesh comprising means for siphoning off unwanted electrostatic charge from said inner surface, said mesh being sufficiently porous as to allow coolant to contact said surface so as to cool the detector.

2. The cryostat dewar of claim 1 wherein a metallic mass supports the two flasks, and the siphoning means comprises a thin metallic grounding strap which grounds the mesh to the metallic mass.

3. The cryostat dewar of claim 1 wherein the foraminous metallic mesh is in the shape of an elongated cylindrical sleeve closed at a first end proximate the detector.

4. The cryostat dewar of claim 1 wherein the foraminous metallic mesh is fabricated of stainless steel.

5. The cryostat dewar of claim 1 wherein the foraminous metallic mesh is a mesh of plain-woven wire cloth in which points where the wires cross are sintered together.

6. The cryostat dewar of claim 1 wherein the mesh is in the shape of an elongated cylindrical sleeve that flares outwardly into a flange at an end remote from the detector;
   the inner flask flares outwardly at a flare region proximate said flange; and
   the cryostat coils comprises means for holding the mesh against the inner surface of the inner flask at said flare region.

* * * * *